Feb. 12, 1963 TADAO YOSHIDA 3,077,001
APPARATUS FOR MANUFACTURING COILED INTERLOCKING
ELEMENTS FOR SLIDE FASTENERS
Filed Oct. 18, 1961 8 Sheets-Sheet 1

Feb. 12, 1963 TADAO YOSHIDA 3,077,001
APPARATUS FOR MANUFACTURING COILED INTERLOCKING
ELEMENTS FOR SLIDE FASTENERS
Filed Oct. 18, 1961 8 Sheets-Sheet 7
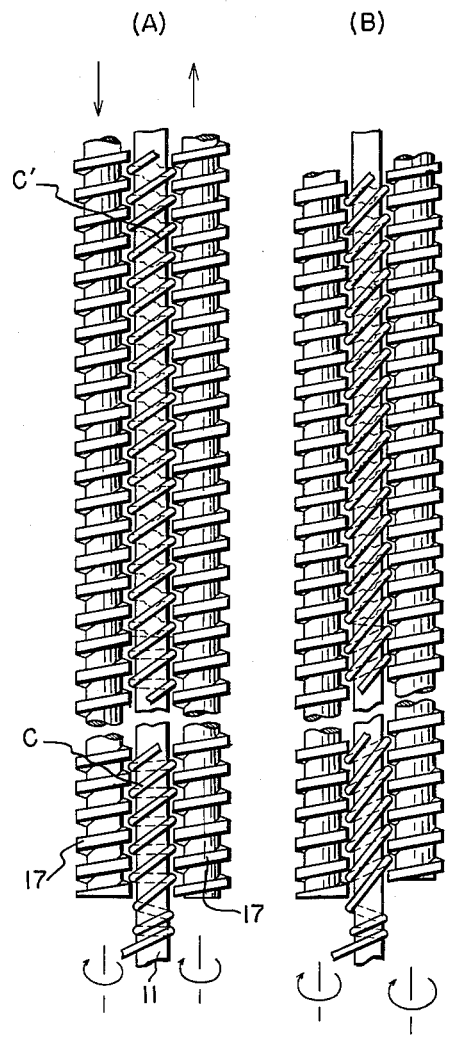
Fig. 13
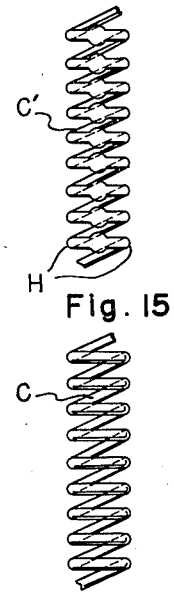
Fig. 14
Fig. 15

United States Patent Office 3,077,001
Patented Feb. 12, 1963

3,077,001
APPARATUS FOR MANUFACTURING COILED INTERLOCKING ELEMENTS FOR SLIDE FASTENERS
Tadao Yoshida, Ichikawa-shi, Japan, assignor to Yoshida Kogyo K.K., Tokyo, Japan, a corporation of Japan
Filed Oct. 18, 1961, Ser. No. 145,843
Claims priority, application Japan June 24, 1961
1 Claim. (Cl. 18—19)

The present invention relates to apparatus for manufacturing coiled interlocking elements for slide fasteners.

The present invention has for its object to provide an apparatus of the kind which is adapted to form coiled interlocking elements at high production rate and thus particularly suitable for production of slide fasteners employing such interlocking elements on a large scale.

Another object of the present invention is to provide an apparatus of the kind adapted to produce coiled interlocking elements for slide fasteners which hold their shape at all times and thus not only may be stitched to fastener tapes with ease but also are free from deformation even when used as part of slide fasteners for any extended period of time.

According to the present invention, there is provided an apparatus for manufacturing coiled interlocking elements for slide fasteners comprising, in combination, means including a rotatable disc and a bobbin mounted thereon and rotatable therewith around a vertically movable mandrel for winding a synthetic resin wire about said mandrel, means including a pair of screw rods disposed on opposite sides of said mandrel and a holder for said screw rods, said screw rods being adapted to effect simultaneous rotation in the same direction as well as alternate intermittent vertical reciprocatory movement for shaping said wire wound about said mandrel into a desired regular coil form, means including a swaging punch operable to form interengaging portions on said successive coil loops immediately after the two legs of each of the coil loops have been aligned horizontally, and blast means provided in said holder for softening said successive coil loops before the latter reach the last-mentioned means and for cooling the coil loops for hardening thereof after the latter have passed the last-mentioned means.

These and other objects, features and advantages of the present invention will be apparent from the following detailed description when read with reference to the accompanying drawings which illustrate one preferred embodiment of the invention and the fastener coil before and after the forming stage thereof.

In the drawings:

FIG. 13A is a front elevation showing the relationship of the mandrel and screw rods before operation;

FIG. 13B is a similar view showing the same in operation;

FIG. 14 is a front view of an interlocking element formed by the apparatus;

FIG. 15 is a similar view of the same with no interengaging heads formed yet.

Figure 1:
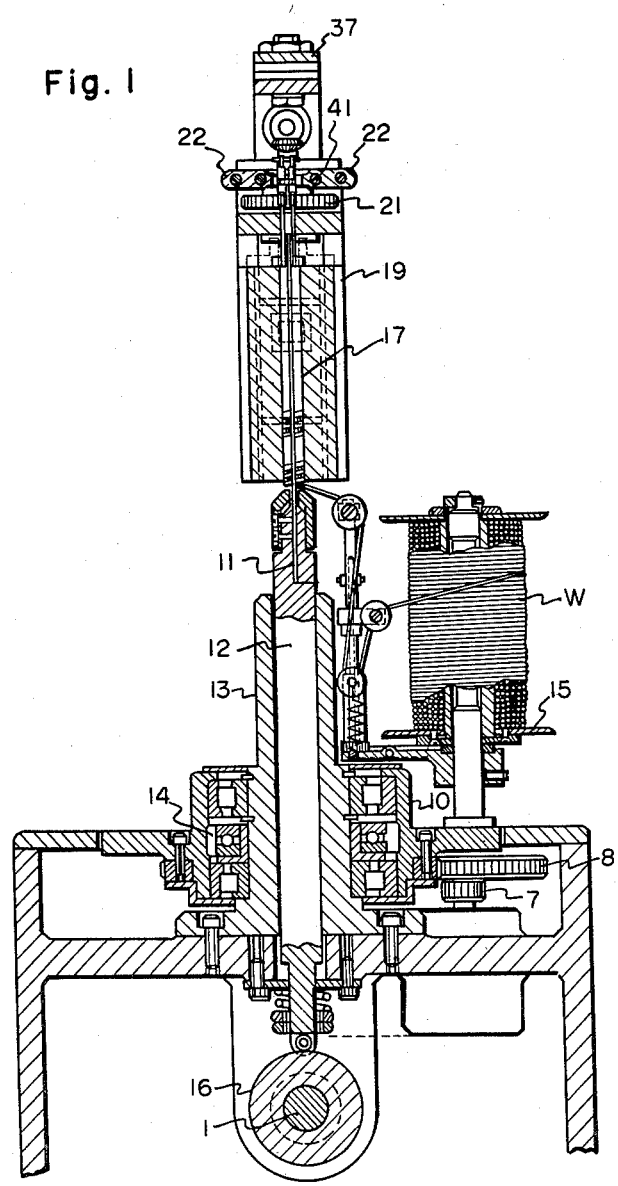
FIG. 1 is a vertical cross-sectional elevation of the apparatus embodying the present invention as viewed from the front.

The construction and operation of the inventive apparatus will now be described for each of the mechanisms comprising the apparatus.

Referring to the accompanying drawings, particularly to FIGS. 1 to 4, the apparatus comprises a drive shaft 1 carrying a bevel gear 2 held in mesh with a cooperating bevel gear 3 carried by a driven shaft 4, which also carries a gear 5, which in turn rotates a disc 10 by way of intermeshing gears 6, 7, 8 and 9 arranged in driving relation in that order.

The disc 10 is rotatably arranged in bearings 14 fitted over a holder guide 13 in which is guidably fitted a holder 12 for holding a mandrel 11, and thus a bobbin 15 mounted on such disc 10 is rotatable about the axis of the mandrel 11. The mandrel holder 12 guidably fitted in the holder guide 13 is associated with a cam 16 secured to the drive shaft 1 for vertical movement, each time of which movement a wire or filament as of synthetic resin being wound about the mandrel 11 by the rotation of the bobbin 15 is moved vertically while being formed into a continuous coil.

Disposed on opposite sides of the mandrel are a pair of screw rods 17 which are received together with the mandrel 11 in a screw rod holder 19 secured to a frame 18 and each carry at the top a shouldered portion 20 and an elongated pinion 21, said shouldered portion being supported by a projection 23 formed on either of rock levers 22 in engagement therewith.

Figure 8:
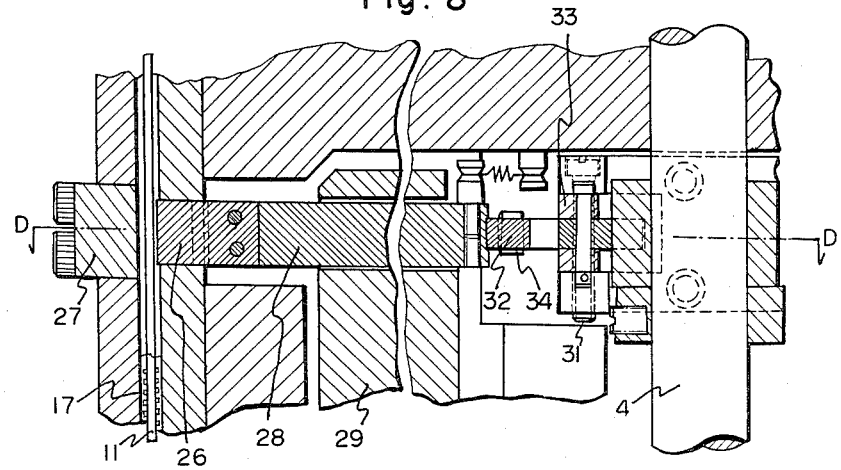
FIG. 8 is a fragmentary enlarged cross-section of the swaging punch mechanism.

Provided on the top and bottom portions of the screw rod holder are respective suitable numbers of cold blast nozzles 24 and hot blast nozzles 25 with a swaging punch 26 and a die 27 therefor fitted therebetween. The swaging punch 26 (FIG. 8) is carried by a punch holder 28 slidably mounted in a punch guide 29 and normally urged rearwardly by a spring S.

The swaging punch 26 is operable by a cam 30 mounted on the driven shaft 4 by way of a pair of levers 32 and 33, pivoted at 31 to act upon the rear end of the punch holder 28 to impart intermittent back and forth movement thereto. Carried by one of the levers 33 is an adjusting screw 34 for suitably adjusting the position of the swaging punch so that the latter may form interengaging portions on successive loops of the coil with the legs of each coil loop aligned horizontally by alternate vertical reciprocatory movement of the screw rods 17.

Figure 2:
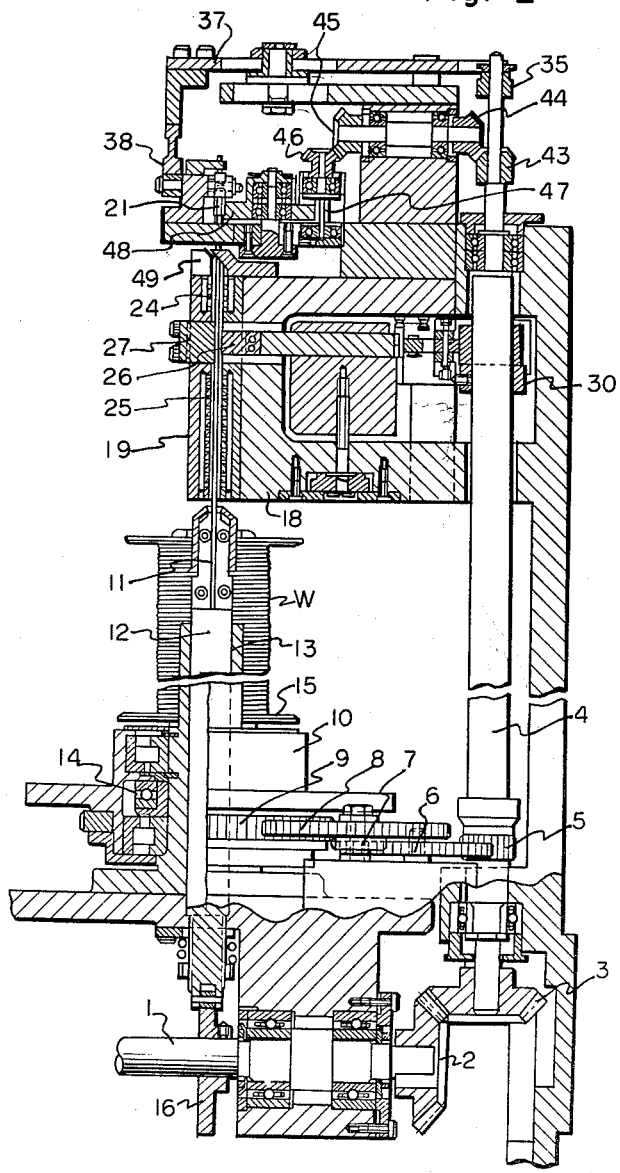
FIG. 2 is a similar view of the same as viewed sidewise.
Figure 4:
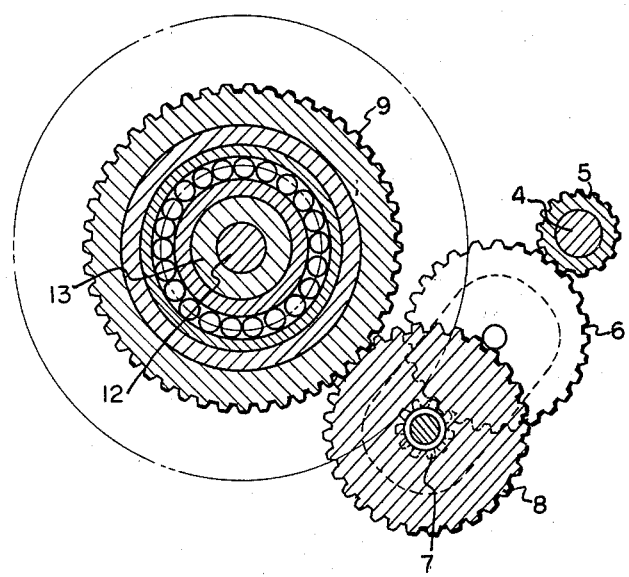
FIG. 4 is a cross-sectional view substantially taken along the line A—A in FIG. 3.
Figure 3:
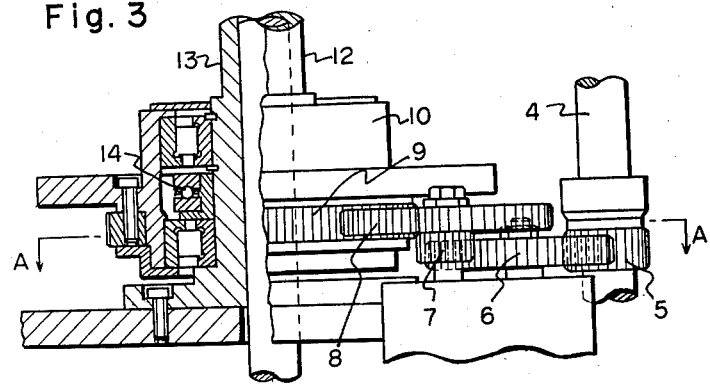
FIG. 3 is a side view, partly in section, of the rotary disc drive mechanism.
Figure 7:
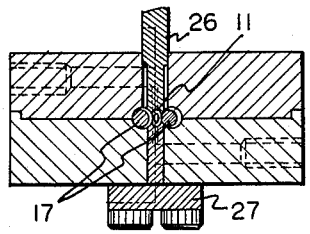
FIG. 7 is a cross-sectional view substantially taken along the line B—B in FIG. 5.
Figure 5:
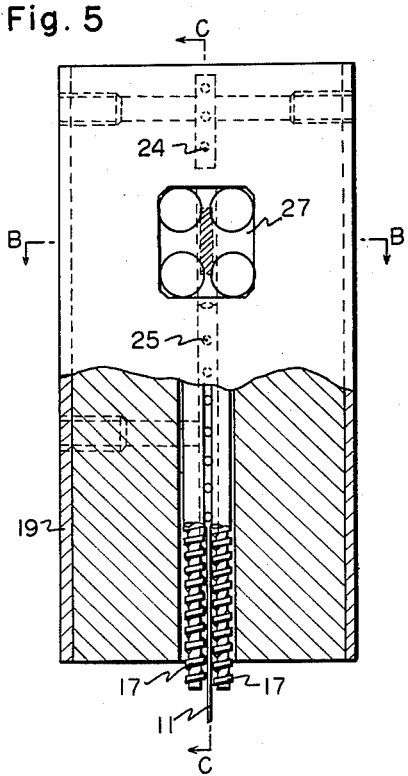
FIG. 5 is a front elevation of the screw rod holder partly broken away to show the interior mechanism thereof.
Figure 6:
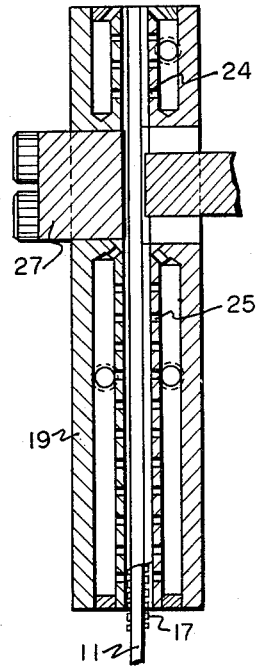
FIG. 6 is a cross-sectional view substantially taken along the line C—C in FIG. 5.
Figure 9:
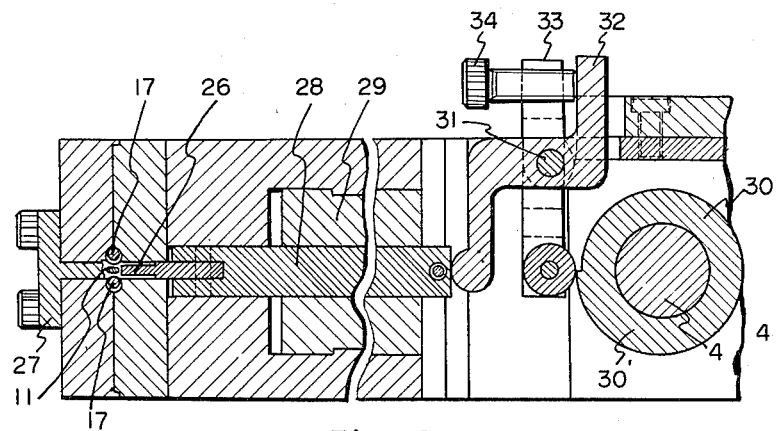
FIG. 9 is a cross-sectional view substantially taken along the line D—D in FIG. 8.
Figure 10:
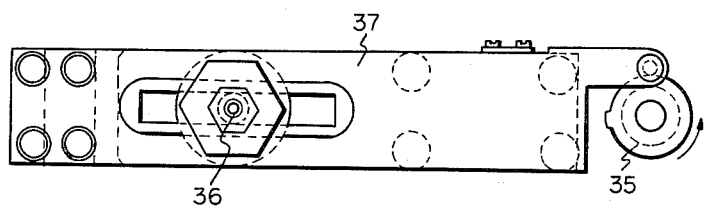
FIG. 10 is a plan view of the rock lever.
Figures 11, 12:
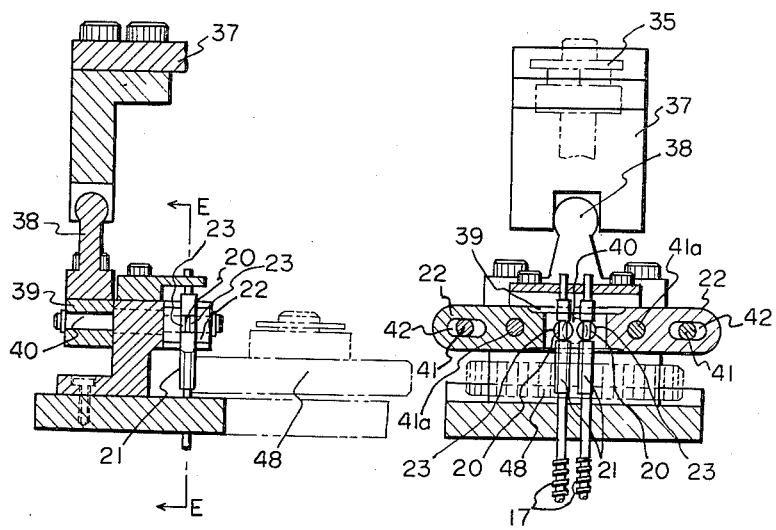
FIG. 11 is a cross-sectional view of the rock mechanism.
FIG. 12 is a cross-sectional view substantially taken along the line E—E in FIG. 11.
Figure 16:
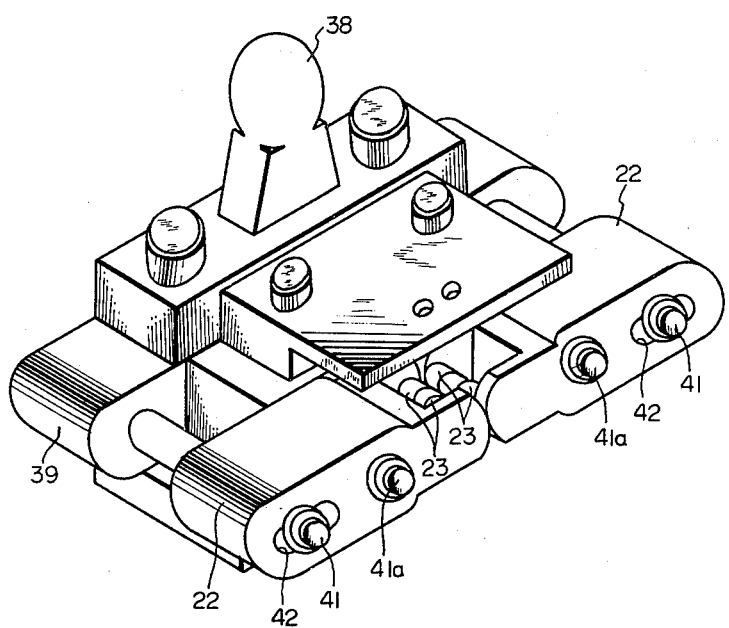
FIG. 16 is a perspective view of the rock mechanism shown in FIGS. 11 and 12.

The intermittent vertical movement of the screw rods 17 is effected as follows: As shown in FIG. 2, the driven shaft 4 carries a cam 35 at the top thereof, which is disposed to impart to a rock lever 37 (FIG. 10) pivoted at 36 intermittent lateral oscillatory movement thereby to operate a rock arm 38 arranged in engagement with said lever 37. Accordingly, a rock lever 39 formed integrally with said arm 38 is caused to effect up and down reciprocatory movement about a stud 40 as a fulcrum (FIG. 11). The rock lever 39 has a pair of spaced parallel pins 41 fitted in respective rock levers 22, which are each laterally slidable by means of a slot 42 formed therein. Since the rock levers 22 carry respective projections 23 in engagement with the shouldered portions of the respective threaded rods 17, as described above, the levers 22 are operable to cause intermittent alternate vertical movement of the screw rods 17.

On the other hand, the driven shaft also carries a separate bevel gear 43, which drives by way of associated bevel gears 44, 45 and 46 and a pinion 47 an intermediate gear 48, which is in mesh with respective pinions 21 formed on the screw rods 17 so as to rotate the latter in the same direction.

In this manner, the screw rods 17 are arranged to effect not only intermittent alternate vertical reciprocatory movement but continuous rotary movement in the same direction.

The hot blast nozzles 25 and cold blast nozzles 24 provided in the screw rod holder function to correct the configuration of the fastener element being formed and to temporarily soften the latter to enable swaging work and to rapidly harden the element worked into its correct shape preventing subsequent deformation of the element.

The mechanisms described hereinbefore are coordinated to operate as follows: Wire W is fed to the base portion of the mandrel 11 from the bobbin 15 under a predetermined tension. The wire is regularly wound round the mandrel 11 by rotation of the bobbin 15 around the latter to form a continuous coil C, which is successively shifted upwardly by the vertical movement of the mandrel caused by the cam 16. The two screw rods 17 disposed on opposite sides of the mandrel 11 and extending parallel thereto rotate in the same direction to retain the coil pitch at a precise value. Meanwhile, the coiled wire or filament C is suitably softened by hot blasts from the hot blast nozzles disposed in the lower half portion of the screw rod holder 19. At the same time, the rock mechanism operates to cause alternate intermittent vertical reciprocation of the opposed screw rods 17 so as alternately to deform the successive coil loops to an extreme inclination as shown in FIG. 13B and to restore them to their initial position thereby to temper the coil for stabilization thereof before the successive coil loops reach the intermediate portion of the screw rod holder where the two legs H of the successive coil loops are horizontally aligned and immediately the swaging punch 26 operates to form a flattened interengaging portion at the front end of the coil loops.

The coil loops now having the desired formation reach the upper half portion of the screw rod holder and are rapidly hardened by cold blasts ejecting from the cold blast nozzles to form a desired coiled element Ca as shown in FIG. 13, such element being delivered continuously to the outside of the apparatus through a guide means 49 for the coiled fastener element.

While one preferred embodiment of the present invention has been shown and described, it is apparent that changes and modifications may be made without departing from the invention in its broader aspects. The aim of the appended claim, therefore, is to cover all such changes and modifications as fall within the scope of the invention.

What is claimed is:

An apparatus for manufacturing coiled interlocking elements for slide fasteners, comprising, in combination, means including a rotatable disc and a bobbin mounted thereon and rotatable therewith around a vertically movable mandrel for winding a synthetic resin wire about said mandrel, means including a pair of screw rods disposed on opposite sides of said mandrel and a holder for said screw rods, said screw rods being adapted to effect simultaneous rotation in the same direction as well as alternate intermittent vertical reciprocatory movement for shaping said wire wound about said mandrel into a desired regular coil form, means including a swaging punch operable to form interengaging portions on said successive coil loops immediately after the two legs of each of the coil loops have been aligned horizontally, and blast means provided in said holder for softening said successive coil loops before the latter reach the last-mentioned means and for cooling the coil loops for hardening thereof after the latter have passed the last-mentioned means.

References Cited in the file of this patent

UNITED STATES PATENTS

| | | |
|---|---|---|
| 2,174,839 | Riddle | Oct. 3, 1939 |
| 2,606,723 | Burdulis | Aug. 12, 1952 |
| 2,707,509 | Nagele | May 3, 1955 |
| 2,843,878 | Berberich | July 22, 1958 |
| 2,973,554 | Hansen | Mar. 7, 1961 |
| 3,035,307 | Yoshida | May 22, 1962 |

FOREIGN PATENTS

| | | |
|---|---|---|
| 264,671 | Switzerland | Jan. 16, 1950 |
| 1,194,694 | France | May 11, 1959 |